(No Model.)
J. ROBERTS.
LEMON JUICE EXTRACTOR.
No. 504,365. Patented Sept. 5, 1893.
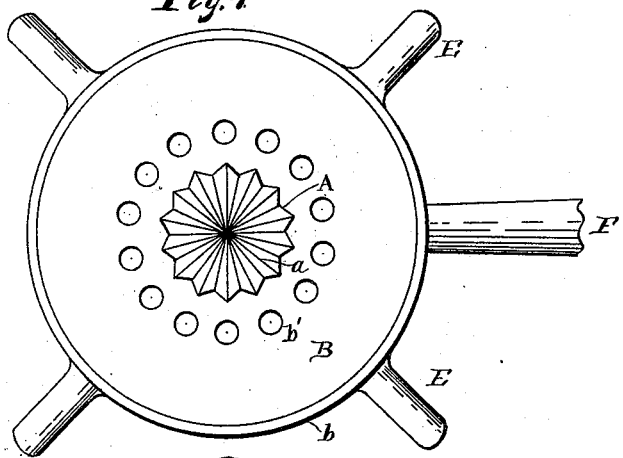
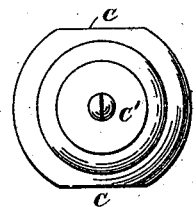
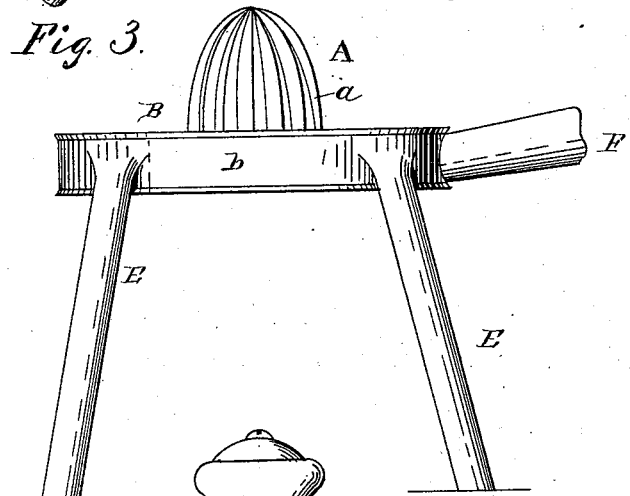
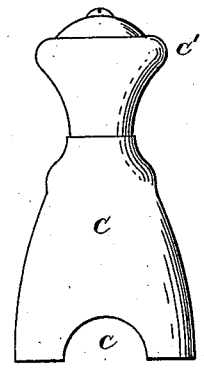
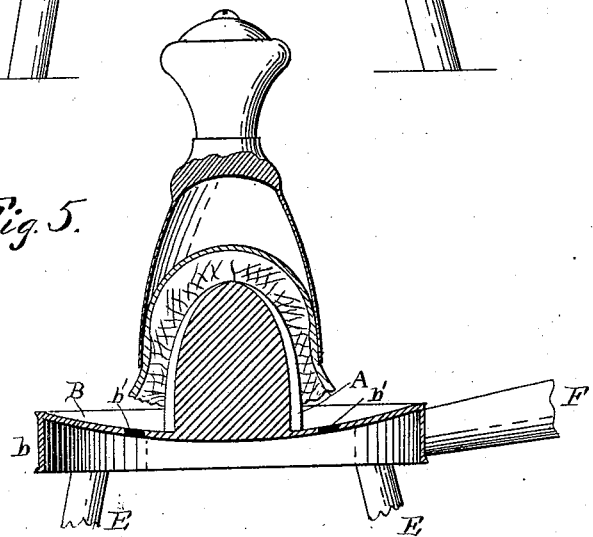
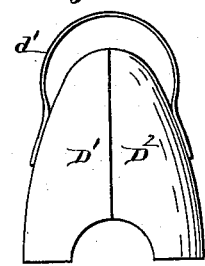
Witnesses
Wm. H. Robinson
S. V. Edmonds
Inventor
Jacob Roberts
By his Attorneys S. Gifford Brown

UNITED STATES PATENT OFFICE.

JACOB ROBERTS, OF POUGHKEEPSIE, NEW YORK.

LEMON-JUICE EXTRACTOR.

SPECIFICATION forming part of Letters Patent No. 504,365, dated September 5, 1893.

Application filed April 13, 1889. Serial No. 307,196. (No model.)

*To all whom it may concern:*

Be it known that I, JACOB ROBERTS, of Poughkeepsie, in the county of Dutchess and State of New York, have invented a certain new and useful Improvement in Lemon-Juice Extractors, of which the following is a specification.

I will describe an apparatus embodying my improvement and then point out the novel features in the claims.

In the accompanying drawings, Figure 1 is a top view of a lemon juice extractor embodying my improvement, a hand piece with which it is provided being removed. Fig. 2 is a top view of the hand piece. Fig. 3 is a side view of the apparatus without the hand piece. Fig. 4, is a side view of the hand piece. Fig. 5 is a central vertical section of the apparatus with a half lemon in place.
Fig. 6 is a side view of a hand piece of modified construction.

Similar letters of reference designate corresponding parts in all the figures.

A designates a dome-shaped support upon which half a lemon may be placed. It is provided on its outer surface with ribs or projections $a$, extending from the base to the apex. There may be any desired number of these ribs or projections $a$. As here shown, they are equidistant from each other and extend over the entire surface of the support A, thus forming a rough or grater like surface, or scraper, over which the lemon is rotated.

B designates a dish or flange extending from the base of the support A. It may be made integral with the support A, or it may be secured thereto in any desired manner. As here shown, it is of circular form and extends upward at a slight incline. At the outer edge it is provided with a downwardly turned rim $b$. It is also provided with a number of perforations $b'$, near the base of the support A. A single row of these perforations will suffice but obviously there may be any desired number. They are for the purpose of permitting the flow of the juice extracted from the lemon, to the glass or receptacle provided for the reception thereof. If this flange or dish, B, should be made of thick material, the perforations $b$, may advantageously be made tapering toward the top so as to facilitate the passage through them of juice and pulp of the lemon entering the same, and to prevent the return of such matter to the top of the dish or flange, or its lodgment in any of the said perforations.

C designates a shell or hand piece, as here shown made to conform internally to the shape of the support A except that it has a smooth interior surface. It may be provided with two notches $c$, diametrically opposite each other, of semicircular form and of sufficient size to permit of the easy removal of the half lemon from the hand piece, by the person using the apparatus, it being thereby possible to use two fingers in grasping the same. This shell or hand piece in the present instance is independent of or not connected with the support provided at the top with a knob or projection $c'$, which may be of any desired configuration. It may be formed integral with the shell or hand piece, or may be secured thereto in any desired manner. It facilitates the rotating of the shell or hand piece C.

In Fig. 6, I have illustrated a dome shaped shell or hand piece of modified construction. As here shown it is composed of two sections $D'$ $D^2$, of equal size, each section being provided with a semicircular notch, such as before described. A narrow strip of metal bent in the shape of a horseshoe forms a spring or clamp $d'$, which extends over the top of the two sections, one of its ends being rigidly secured to the outer side of the section $D'$ midway between the side edges of said section and about equidistant from the top and bottom thereof, in any desired manner, and its other end being secured to the section $D^2$, in like manner. This spring or clamp $d'$, when the shell or hand piece is not in use, holds the sections $D'$ $D^2$, together, and when the shell or hand piece is in use, its two sections are held firmly against the sides of the lemon during the squeezing operation. This form of hand piece is very advantageous in that it may be applied to a lemon of any size. The spring or clamp $d'$ may also serve as a handle for the shell or hand piece during the rotation of the hand piece.

The dish or flange B, may be provided with legs or supports E. As here shown there are four of these legs or supports. They may be rigidly secured to the rim $b$, of the dish or flange A, at equal distances from each other, by solder, or in any other suitable manner. In the present instance they extend in a slightly oblique direction. They may however, be vertical, and of any desired length or configuration. They are preferably of sufficient length to admit of the placing of a glass, or other receptacle, provided to receive the juice extracted from a lemon, under the dish or flange B. These legs or supports are not an essential feature of my improvement. They are advantageous because they tend to prevent any danger of breaking the glass, or other receptacle, provided to receive the juice of the lemon, which might otherwise occur from pressing the apparatus too hard down upon the said receptacle or glass.

F designates a handle, which, as here shown, is rigidly secured to the rim $b$, of the flange or dish B. It may be secured thereto by solder, or in any other suitable manner, and may be of any desired configuration. I have shown it as of cylindrical form tapering slightly toward the end which is secured to the rim $b$.

All the parts may be made of sheet metal or any other suitable material.

The glass or other receptacle, provided to receive the juice to be extracted from the lemon, is placed under the apparatus so that the perforations in the dish or flange B, will be over the same. Half a lemon is then placed in the shell or hand piece and the latter with the lemon therein, is pressed down upon the dome-shaped support A, and rotated upon the same until all the juice has been extracted from the lemon, and as the hand piece is operated directly by the hand a slight lateral movement may be imparted to it to adapt it to the lemon. The juice thus extracted will run down the support A, into the dish or flange B, and through the perforations thereof into the glass or other receptacle, provided to receive it. This operation will occupy but a very short time and necessitates very little handling of the lemon. The hand piece may then be removed and with it, the lemon. After its removal the lemon may then be easily removed from the hand-piece, by the use of the forefinger and thumb of the person using the apparatus, the notches $c$, in the hand piece, permitting of this. During the operation the apparatus may be held firmly in place by means of the handle F.

I do not wish to restrict myself to any particular number of ribs or projections, nor to making them of any particular form. Anything having a salient edge or made protuberant relatively to the adjacent surface, will constitute a rib or projection within the meaning I desire to convey by the use of the terms "rib" and "projection."

What I claim as my invention, and desire to secure by Letters Patent, is—

1. A lemon juice extractor consisting, essentially, of a dome-shaped support having ribbed or roughened surfaces and rigidly mounted upon legs, and an independent elastic shell or hand piece having a smooth interior surface and diametrically opposite notches in its lower edge said support and hand piece being adapted and arranged to operate substantially in the manner and for the purpose set forth.

2. In a lemon juice extractor, the combination with the dome-shaped support having a ribbed or roughened surface, of a shell or hand piece consisting of two sections connected by a spring or clamp, and formed so as to be adapted to receive half a lemon and to be rotated with the same, on the dome-shaped support, substantially as specified.

JACOB ROBERTS.

Witnesses:
SMITH HEVOY,
FRANK VAN BENSCHOTEN.